(12) United States Patent
Lee et al.

(10) Patent No.: US 8,106,861 B2
(45) Date of Patent: Jan. 31, 2012

(54) REFLECTIVE TYPE ELECTRO-WETTING DISPLAY DEVICE

(75) Inventors: Rei-Yun Lee, Miao-Li (TW);
Jung-Lung Huang, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 710 days.

(21) Appl. No.: 12/229,638

(22) Filed: Aug. 25, 2008

(65) Prior Publication Data
US 2009/0051632 A1     Feb. 26, 2009

(30) Foreign Application Priority Data

Aug. 24, 2007    (CN) .......................... 2007 1 0076570

(51) Int. Cl.
*G09G 3/34*    (2006.01)
(52) U.S. Cl. .......................................... 345/84; 345/93
(58) Field of Classification Search ............ 345/84–100, 345/204–215, 690; 359/220–228, 253, 290–297
See application file for complete search history.

(56) References Cited

U.S. PATENT DOCUMENTS

| 7,872,790 | B2* | 1/2011 | Steckl et al. ................. 359/253 |
| 2006/0200106 | A1 | 9/2006 | Okubo |
| 2007/0263306 | A1 | 11/2007 | Hayes et al. |
| 2008/0297880 | A1* | 12/2008 | Steckl et al. ................. 359/291 |
| 2009/0027760 | A1* | 1/2009 | Wang et al. ................... 359/291 |
| 2010/0109987 | A1* | 5/2010 | Jessop ............................ 345/84 |

* cited by examiner

*Primary Examiner* — Vijay Shankar
(74) *Attorney, Agent, or Firm* — Altis Law Group, Inc.

(57) ABSTRACT

An electro-wetting display device includes a first substrate; a second substrate opposite to the first substrate; a plurality of side walls interposed between the first and second substrates, the side walls being arranged in a matrix and cooperating with the first and second substrates to form a plurality of spaces; a first polar liquid disposed in each of the spaces; a second, colored, non-polar liquid disposed in each of the spaces. The second liquid is immiscible with the first liquid. The second substrate includes a reflective electrode and a hydrophobic insulating layer disposed on the reflective electrode. The reflective electrode includes a first metal layer and a transparent protective layer, and the transparent protective layer is interposed between the metal layer and the hydrophobic insulating layer.

17 Claims, 4 Drawing Sheets

REFLECTIVE TYPE ELECTRO-WETTING DISPLAY DEVICE

CROSS-REFERENCE TO RELATED APPLICATION

This application is related to, and claims the benefit of, a foreign priority application filed in China as Serial No. 200710076570.9 on Aug. 24, 2007. The related application is incorporated herein by reference.

FIELD OF THE INVENTION

The present invention relates to display devices, and more particularly to a reflective type electro-wetting display device having first and second immiscible fluid within a space between a first transparent support plate and a second support plate.

GENERAL BACKGROUND

Display devices like TFT-LCDs (thin film transistor liquid crystal displays) are used in laptop computers, but also find an increasingly wider application in GSM telephones. Instead of LCDs, for example, (polymer) LED display devices are also being used. Apart from these types of displays, other display techniques, such as electro-wetting display (EWD) devices being suitable for flat plate displays are evolved. The electro-wetting functionality provides displays with excellent brightness and contrast, and relatively low power consumption compared to many other display technologies.

For utilizing the ambient light to display images, a kind of reflective type EWD device is installed. In general, the reflective type EWD device includes a TFT matrix, a reflective electrode, and an insulating layer disposed on a lower substrate thereof, form bottom to top. The reflective electrode may be made of aluminum, which serves for reflecting ambient light. However, the aluminum electrode layer is liable to form a plurality of hillocks on a surface thereof, which may prong the insulating layer during the process of forming the insulating layer on the electrode. Then, the electric filed generated between the electrode and a first conductive liquid of the EWD device is not uniform, which may impair the reliability of the reflective type EWD device.

It is, therefore, needed to provide a reflective type EWD device that can overcome the above-described deficiencies.

SUMMARY

An electro-wetting display device includes a first substrate; a second substrate opposite to the first substrate; a plurality of side walls interposed between the first and second substrates, the side walls being arranged in a matrix and cooperating with the first and second substrates to form a plurality of spaces; a first polar liquid disposed in each of the spaces; a second, colored, non-polar liquid disposed in each of the spaces. The second liquid is immiscible with the first liquid. The second substrate includes a reflective electrode and a hydrophobic insulating layer disposed on the reflective electrode. The reflective electrode includes a first metal layer and a transparent protective layer, and the transparent protective layer is interposed between the metal layer and the hydrophobic insulating layer.

A method for manufacturing an electro-wetting display device, includes the steps of: providing a first substrate; providing a second substrate opposite to the first substrate; providing a plurality of side walls between the first and second substrates, the side walls being arranged in a matrix and cooperating with the first and second substrates to form a plurality of spaces; providing a first polar liquid in each of the spaces; providing a second, colored, non-polar liquid in each of the spaces, and the second liquid being immiscible with the first liquid; and forming a reflective electrode on the second substrate, the reflective electrode comprising a first metal layer and a transparent protective layer; and forming a hydrophobic insulating layer on the transparent protective layer.

Other novel features and advantages will become more apparent from the following detailed description when taken in conjunction with the accompanying drawings, in which:

DETAILED DESCRIPTION OF PREFERRED EMBODIMENTS

Reference will now be made to the drawings to describe preferred and exemplary embodiments of the present invention in detail.

Figure 1:
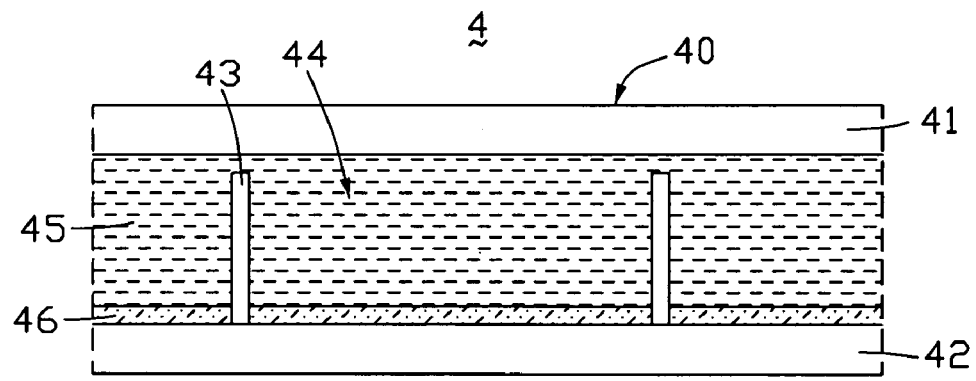
FIG. 1 is a side, cross-sectional view of parts of a reflective type EWD device according to a first embodiment of the present invention.

Referring to FIG. 1, a side, cross-sectional view of parts of a reflective EWD device 4 according to a first embodiment of the present invention is shown. The EWD device 4 includes an upper substrate 41, a lower substrate 42 disposed parallel to and spaced apart from the upper substrate 41, and a plurality of side walls 43 interposed between the upper and lower substrates 41, 42. The side walls 43 are arranged in a matrix and cooperate with the upper and lower substrates 41, 42 to form a plurality of receiving spaces 44. The side walls 43 also divide the reflective EWD device 4 into a multiplicity of pixel units 40 in an array type. The upper and lower substrates 41, 42 are made of transparent material, such as glass, plastic or the like.

The space 44 of each of the pixel units 40 is filled with a first liquid 45 and a second liquid 46. The first liquid 45 is polar, conductive water solution or salt solution, such as a solution mixed with Ethyl Alcohol and potassium chloride solution. The second liquid 46 is non-polar, insulative liquid, such as oil, Alkane, Hexadecane or the like. The second liquid 46 can be colored with a dye (or in some cases pigment), and serves as a shielding liquid. The first and second liquid 45, 46 are immiscible.

Figure 2:
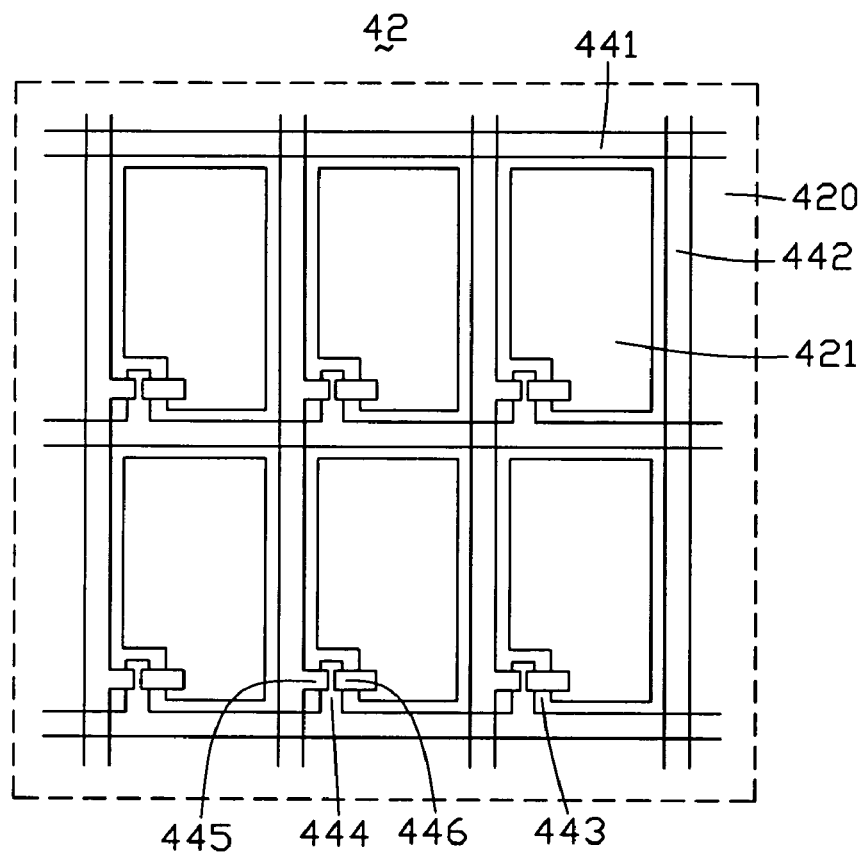
FIG. 2 is a top, plan view of parts of pixel units of the reflective EWD device of FIG. 1, each pixel unit including a TFT.

Referring to FIG. 2, a top, plan view of parts of pixel units 40 of the reflective EWD device 4 is shown. The lower substrate 42 includes a plurality of rows of parallel scanning lines 441, a plurality of columns of parallel data lines 442, a plurality of TFTs 443 disposed near intersections of a corresponding one of the scanning lines 441 and a corresponding one of the data lines 442, and a plurality of reflective electrodes 421. The scanning lines 441, the data lines 442, the TFTs 443, and the reflective electrodes 421 are disposed on a glass substrate unit 420. In each pixel unit 40, each TFT 443 is coupled to a corresponding reflective electrode 421. A gate electrode of the TFT 443 is connected to a corresponding scanning line 441, and a source electrode of the TFT 443 is connected to a corresponding data line 442. Further, a drain electrode of the TFT 443 is connected to a corresponding reflective electrode 421.

Figure 3:
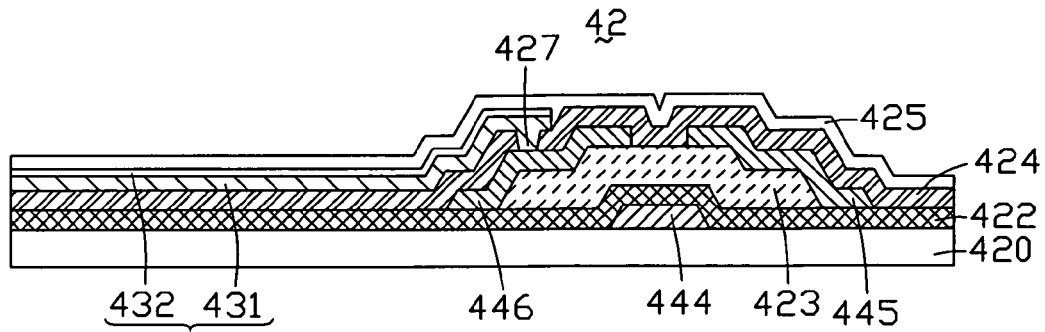
FIG. 3 is a cross-sectional view of parts of the TFT of the pixel unit of FIG. 2.

Also referring to FIG. 3, a cross-sectional view of parts of the TFT 443 is shown. The second substrate further includes a gate insulating layer 422, a semiconductor pattern 423, a passivation layer 424, and a hydrophobic insulating layer 425. A gate electrode 444 of the TFT 423 is disposed on the glass substrate unit 420, and the gate insulating layer 422 covers the gate electrode 444 and the glass substrate unit 420. The semiconductor pattern 423 is disposed on the gate insulating layer 422, and a source electrode 445 and a drain electrode 446 are disposed on the gate insulating layer 422 and the semiconductor pattern 423. The passivation layer 424 covers the gate insulating layer 422, the semiconductor pattern 423, and the source and drain electrodes 445, 446. The reflective electrode 421 is disposed on the passivation layer 424, and the hydrophobic insulating layer 425 covers the reflective layer 421 and the passivation layer 424.

The reflective electrode 421 includes a first metal layer 431 and a protective layer 432 covering the first metal layer 431. The first metal layer 431 may be made of aluminum with high reflectivity, so as to make the EWD device 4 to utilize the ambient light with a high efficiency. The protective layer 432 may be made of transparent material, such as Aluminum oxide. The first metal layer 431 includes a through hole 427 drilling through the passivation layer 424, and is connected to the drain electrode 446 via the through hole 427.

The aluminum first metal layer 431 is liable to form hillocks on a surface. In the EWD device 4, the transparent protective layer 432 is disposed on the first metal layer 431, so as to smooth a surface of the first metal layer 431. Thus, the protective layer 432 prevents the hydrophobic insulating layer 425 from being pronged by the hillocks of the first metal layer 431. Therefore, the EWD device 4 has a high reliability.

Figure 4:
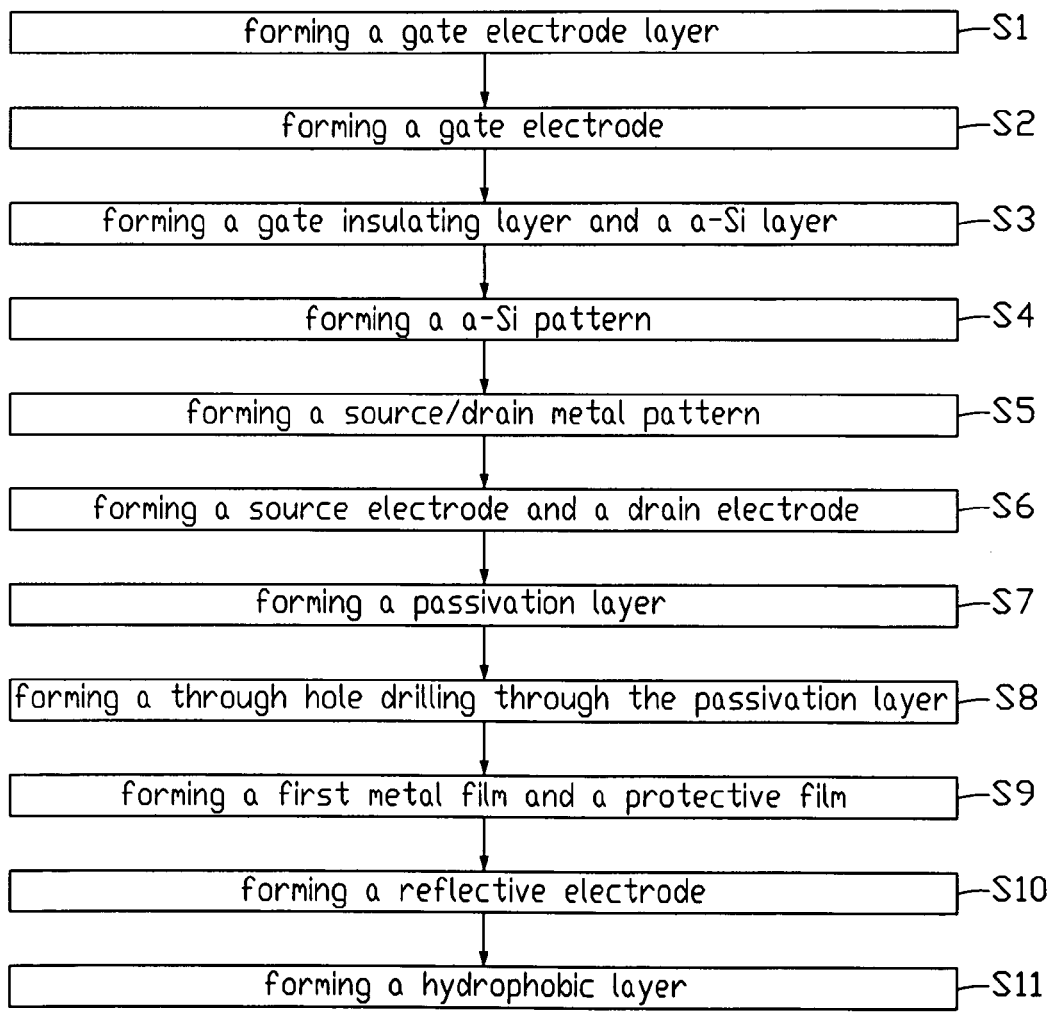
FIG. 4 is a flow chart of an exemplary method for manufacturing the TFT of FIG. 3.

Referring to FIG. 4, a flow chart of an exemplary method for manufacturing the second substrate 42 is shown. The manufacturing steps are described in detail as follows:

In step S1, forming a gate electrode layer; providing a glass substrate unit 420, depositing a gate electrode metal layer and a first resist layer on the glass substrate unit 420 in that order.

In step S2, this includes forming a gate electrode; treating the first resist layer with an exposure and development process via a first mask, so as to form a first resist pattern. Then, etching the gate electrode layer via the first resist pattern to form the patterned gate electrode 444, and removing the first resist layer.

In step S3, forming a gate insulating layer 422 and a a-Si layer; depositing a gate insulating layer 422, a a-Si layer (semiconductor layer), and a second resist layer on the gate electrode 444 and the glass substrate unit 420.

In step S4, forming a a-Si pattern; treating the second resist layer with an exposure and development process via a second mask, so as to form a second resist pattern. Then, introducing impurities into the a-Si layer, and etching the a-Si layer via the second resist pattern to from the a-Si pattern 423, and removing the second resist layer.

In step S5, forming a source/drain metal pattern; providing a source/drain metal layer and a third resist layer on the glass substrate unit 420 and the a-Si pattern.

In step S6, forming a source electrode and a drain electrode; treating the third resist layer with an exposure and development process via a third mask, so as to form a third resist pattern, and etching the source/drain metal layer via the third resist pattern to from the source electrode 445 and the drain electrode 446, and then removing the third resist layer.

In step S7, forming a passivation layer 424; depositing a passivation layer 424 and a fourth resist layer on the gate insulating layer 422, the source electrode 445, the drain electrode 446 and the a-Si layer 423 in that order.

In step S8, forming a through hole 427 drilling through the passivation layer 424; treating the fourth resist layer with an exposure and development process via a fourth mask, so as to form a fourth resist pattern, etching the passivation layer 424 via the fourth resist pattern to from the through hole 427, and removing the fourth resist layer.

In step S9, forming a first metal film and a protective film; providing a first metal film on the passivation layer 424, the first metal layer may be made of aluminum, and which has a height at 1000 (A). Treating the first metal layer in a chamber filling with oxygen, generating oxygen plasma via an APCVD (atmospheric pressure chemical vapor deposition) or a PECVD (plasma enhanced chemical vapor deposition) process in the chamber. After that, the aluminum reacts with the oxygen plasma to produce an $Al_2O_3$ film having smooth surface, which serves as the protective film. In that chamber, a temperature is set in a range of 25° C. to 600° C., a pressure is set in a range of $1.333\times10^4$ $N/m^2$ to $6.555\times10^4$ $N/m^2$, and a time to react is less than or equal to one minute, and then providing a fifth resist layer on the protective layer.

In step S10, forming a reflective electrode 421; treating the fifth resist layer with an exposure and development process via a fifth mask, so as to form a fifth resist pattern, etching the first metal layer and the protective layer via the fifth resist pattern to from the first metal layer 431 and the protective layer 432, so as to forming the reflective electrode 421, and removing the fifth resist layer.

In step S11, forming a hydrophobic layer 425; depositing an insulating hydrophobic layer 425 on the reflective electrode 421 and the passivation layer 424.

According to the manufacturing steps, the transparent protective layer 432 is formed on the first metal layer 431, so as to smooth a surface of the first metal layer 431. Thus, the protective layer 432 prevents the hydrophobic insulating layer 425 from being pronged by the hillocks of the first metal layer 431. Therefore, the EWD device 4 has a high reliability.

Figure 5:
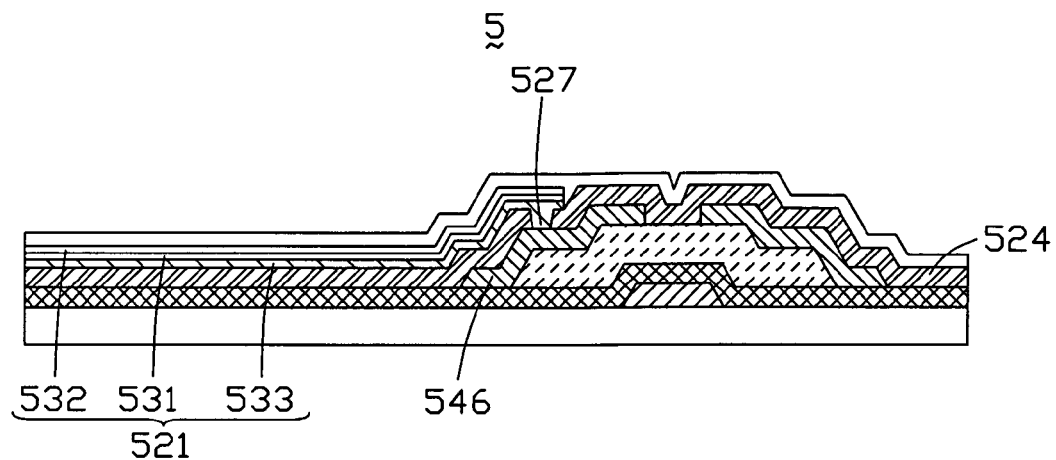
FIG. 5 is a cross-sectional view of parts of a TFT of a pixel unit of a reflective type EWD device according to a second embodiment of the present invention.

Referring to FIG. 5, a cross-sectional view of parts of a TFT of a pixel unit of a reflective type EWD device 5 according to a second embodiment of the present invention. In the EWD device 5, the reflective electrode 521 includes a first metal layer 531, a second metal layer 533, and a protective layer 532. The second metal layer 533 is disposed on the passivation layer 524, and the first metal layer 531 is disposed on the second metal layer 533. Further, the protective layer 532 is disposed on the first metal layer 531. The second metal layer 533 is connected to a drain electrode 546 via a through hole 527 drilling through the passivation layer 524. The second metal 533 may be made of firm conductive material, such as indium-tin-oxide (ITO) or indium-zinc-oxide (IZO). The first metal layer 531 may be made of aluminum.

Figure 6:
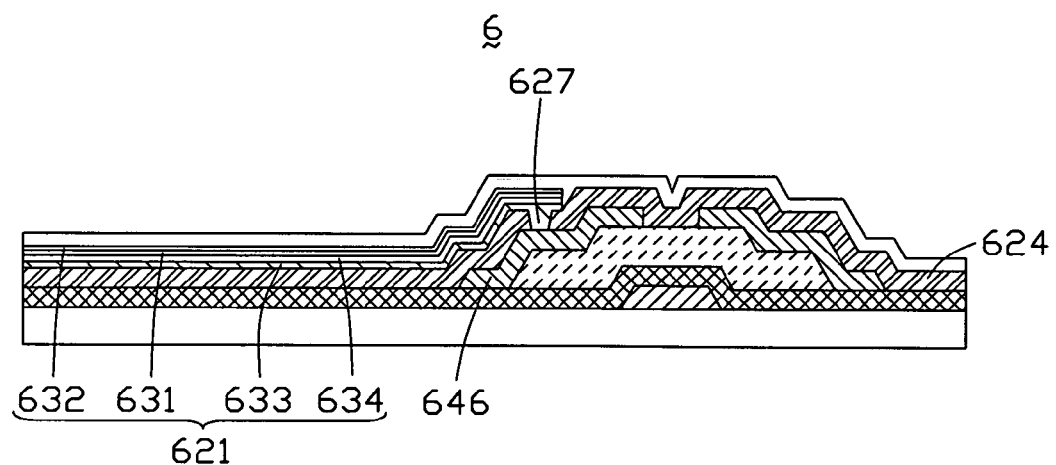
FIG. 6 is a cross-sectional view of parts of a TFT of a pixel unit of a reflective type EWD device according to a third embodiment of the present invention.

Referring to FIG. 6, a cross-sectional view of parts of a TFT of a pixel unit of a reflective type EWD device 6 according to a third embodiment of the present invention. In the EWD device 6, the reflective electrode 621 includes a first metal layer 631, a second metal layer 633, a buffer layer 634, and a protective layer 632. The second metal layer 633 is disposed on the passivation layer 624, and the buffer layer 634 is disposed on the second metal layer 633. The buffer layer has a height of 500 (A). The first metal layer 631 is disposed on the buffer layer 634, and the first metal layer 631 has a height of 1000 (A). Further, the protective layer 632 is disposed on the first metal layer 631. The second metal layer 633 is connected to a drain electrode 646 via a through hole 627 drilling through the passivation layer 624. The second metal 633 may be made of firm conductive material, such as indium-tin-oxide (ITO) or indium-zinc-oxide (IZO). The first metal layer 631 may be made of aluminum. The buffer layer 634 may be made of stable metal material, such as molybdenum (Mo), which is not liable to react with the first and second metal layer 631, 633.

Figure 7:
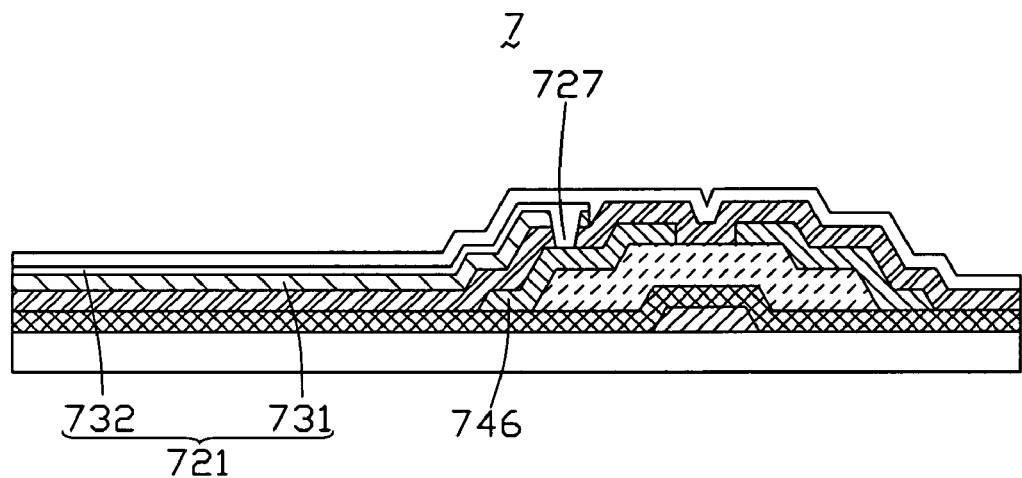
FIG. 7 is a cross-sectional view of parts of a TFT of a pixel unit of a reflective type EWD device according to a fourth embodiment of the present invention.

Referring to FIG. 7, a cross-sectional view of parts of a TFT of a pixel unit of a reflective type EWD device 7 according to a second embodiment of the present invention. In the EWD device 7, the protective layer 732 of the reflective electrode 721 is transparent and conductive, which is connected to a drain electrode 746 via a through hole 727 drilling through the passivation layer 724. The protective layer 732 may be made of transparent metal material, such as includes indium-tin-oxide (ITO) or indium-zinc-oxide (IZO). The first metal layer 731 may be made of aluminum.

Figure 8:
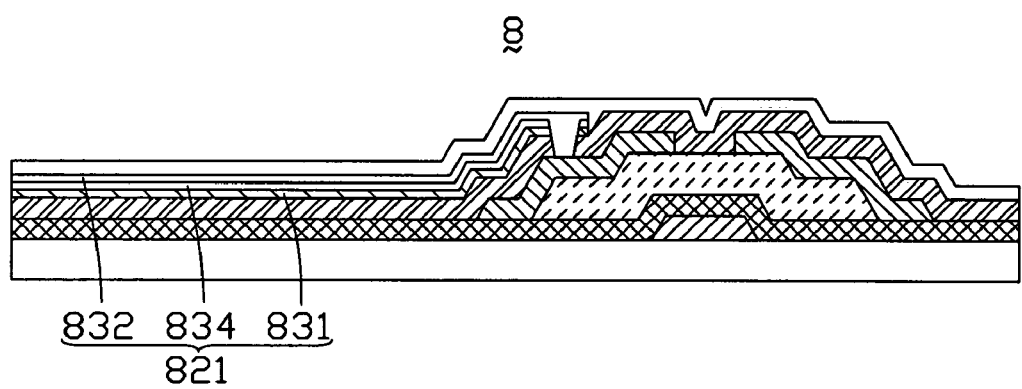
FIG. 8 is a cross-sectional view of parts of a TFT of a pixel unit of a reflective type EWD device according to a fifth embodiment of the present invention.

Referring to FIG. 8, a cross-sectional view of parts of a TFT of a pixel unit of a reflective type EWD device 8 according to a third embodiment of the present invention. In the EWD device 8, the reflective electrode 821 includes a buffer layer 834 disposed between the first metal layer 831 and the protective layer 832. The buffer layer 834 may be made of stable metal material, such as molybdenum (Mo), which is not liable to react with the first metal layer 831

It is to be further understood that even though numerous characteristics and advantages of preferred and exemplary embodiments have been set out in the foregoing description, together with details of structures and functions associated with the embodiments, the disclosure is illustrative only, and changes may be made in detail (including in matters of arrangement of parts) within the principles of the invention to the full extent indicated by the broad general meaning of the terms in which the appended claims are expressed.

What is claimed is:

1. An electro-wetting display device, comprising:
    a first substrate;
    a second substrate opposite to the first substrate;
    a plurality of side walls interposed between the first and second substrates, the side walls being arranged in a matrix and cooperating with the first and second substrates to form a plurality of spaces;
    a first polar liquid disposed in each of the spaces;
    a second, colored, non-polar liquid disposed in each of the spaces, and the second liquid being immiscible with the first liquid; and
    wherein the second substrate comprises a reflective electrode and a hydrophobic insulating layer disposed on the reflective electrode, the reflective electrode comprises a first metal layer and a transparent protective layer, the first metal layer liable to form hillocks on a surface of the first metal layer and configured to provide a voltage, and the transparent protective layer has a smooth surface, the transparent protective layer is disposed on the first metal layer and interposed between the first metal layer and the hydrophobic insulating layer, the hydrophobic insulating layer contacts with the smooth surface of the transparent protective layer and is prevented from contacting with the hillocks of the first metal layer by the transparent protective layer.

2. The electro-wetting display device as claimed in claim 1, wherein the first metal layer of the reflective electrode is made of aluminum.

3. The electro-wetting display device as claimed in claim 2, wherein the transparent protective layer is aluminum oxide.

4. The electro-wetting display device as claimed in claim 1, wherein the transparent protective layer is an insulating protective layer.

5. The electro-wetting display device as claimed in claim 1, wherein the reflective electrode further comprises a second metal layer disposed under the first metal layer.

6. The electro-wetting display device as claimed in claim 5, wherein the second metal layer is made of indium-tin-oxide or indium-zinc-oxide.

7. The electro-wetting display device as claimed in claim 6, wherein the reflective metal layer comprises a buffer layer disposed between the first and second metal layers.

8. The electro-wetting display device as claimed in claim 7, wherein the buffer layer is made of molybdenum.

9. The electro-wetting display device as claimed in claim 1, wherein the transparent protective layer is a conductive protective layer.

10. The electro-wetting display device as claimed in claim 9, wherein the transparent protective layer is made of indium-tin-oxide or indium-zinc-oxide.

11. The electro-wetting display device as claimed in claim 10, wherein the reflective metal layer comprises a buffer layer disposed between the first metal layer and the transparent protective layer.

12. The electro-wetting display device as claimed in claim 11, wherein the buffer layer is made of molybdenum.

13. A method for manufacturing an electro-wetting display device, comprising:
    providing a first substrate;
    providing a second substrate opposite to the first substrate;
    providing a plurality of side walls between the first and second substrates, the side walls being arranged in a matrix and cooperating with the first and second substrates to form a plurality of spaces;
    providing a first polar liquid in each of the spaces;
    providing a second, colored, non-polar liquid in each of the spaces, and the second liquid being immiscible with the first liquid; and
    forming a reflective electrode on the second substrate, the reflective electrode comprising a first metal layer and a transparent protective layer, wherein the first metal layer liable to form hillocks on a surface of the first metal layer and configured to provide a voltage, and the transparent protective layer has a smooth surface, the transparent protective layer is disposed on the first metal layer; and
    forming a hydrophobic insulating layer on the transparent protective layer, wherein the hydrophobic insulating layer contacts with the smooth surface of the transparent protective layer and prevented from contacting with the hillocks of the first metal layer by the transparent protective layer.

14. The method as claimed in claim 13, wherein the first metal layer is formed by aluminum, and the transparent protective layer is aluminum oxide, the aluminum oxide is formed via reacting the first metal layer and oxygen plasma in a chamber.

15. The method as claimed in claim 14, wherein a temperature is set in a range of 25° C. to 600° C. in the chamber.

16. The method as claimed in claim 14, wherein a pressure is set in a range of $1.333 \times 10^4$ N/m$^2$ to $6.555 \times 10^4$ N/m$^2$ in the chamber.

17. The method as claimed in claim 14, wherein a time for reacting is less than or equal to one minute.

* * * * *